United States Patent [19]
Aoki

[11] Patent Number: 5,291,967
[45] Date of Patent: Mar. 8, 1994

[54] POWER UNIT MOUNTING DEVICE

[75] Inventor: Hirofumi Aoki, Chigasaki, Japan

[73] Assignee: Nissan Motor Co., Ltd., Yokohama, Japan

[21] Appl. No.: 809,442

[22] Filed: Dec. 19, 1991

[30] Foreign Application Priority Data

Dec. 28, 1990 [JP] Japan .................. 2-409082

[51] Int. Cl.⁵ .............................. F16F 1/36
[52] U.S. Cl. .................. 180/312; 248/562; 248/638; 267/140.14
[58] Field of Search ............ 180/312, 299, 300; 267/136, 140.14, 140.15; 248/550, 562, 638

[56] References Cited

U.S. PATENT DOCUMENTS

| | | | |
|---|---|---|---|
| 1,729,394 | 9/1929 | Lee | 180/299 |
| 4,744,539 | 5/1988 | Stimeling | 248/638 |

FOREIGN PATENT DOCUMENTS

| | | | |
|---|---|---|---|
| 59-23140 | 2/1984 | Japan . | |
| 59-65640 | 4/1984 | Japan | 267/140.14 |
| 114521 | 5/1989 | Japan | 180/300 |
| 114522 | 5/1989 | Japan | 180/312 |

Primary Examiner—Karin L. Tyson
Attorney, Agent, or Firm—Foley & Lardner

[57] ABSTRACT

A power unit mounting device for a motor vehicle includes a first plate, a second plate secured to the vehicle body and a bracket member having a flat plate portion which is disposed between the first and second plates. A first active damping actuator is intimately disposed between the first plate and the flat plate portion and a second active damping actuator is intimately disposed between the flat plate portion and the second plate. Each of the first and second active damping actuators selectively expands and contracts in accordance with an electric power applied thereto. Connecting bolts are used for connecting the first and second plates to tighten the first and second active damping actuators therebetween. A controller is employed for controlling the electric power in such a manner that the expanding and contracting vibrations of the first and second active damping actuators are equal in amplitude but different in phase by 180 degrees.

16 Claims, 4 Drawing Sheets

POWER UNIT MOUNTING DEVICE

BACKGROUND OF THE INVENTION

1. Field of the Invention

The present invention relates in general to mounting devices for mounting an automotive power unit or the like and more particularly to power unit mounting devices of a type which is equipped with an active damping actuator.

2. Description of the Prior Art

One of power unit mounting devices the above-mentioned type is disclosed in Japanese Patent First Provisional Publication No. 59-23140. In the device of this publication, for absorbing vibrations caused by a power unit, there is employed a unit of laminated electrostrictive elements whose thickness varies in accordance with a sine-wave voltage applied thereto. The unit is disposed between the power unit and a support structure in such a manner that the vibrations of the power unit can be cancelled by the repeated variations in thickness of the unit of laminated electrostrictive elements. That is, the unit of laminated electrostrictive elements and the power unit are so arranged that the direction in which the thickness of the unit of electrostrictive elements varies is consistent with the direction in which the power unit vibrates. Therefore, vibrations transmitted from the power unit to the support structure can be reduced to a minimum level.

In fact, the power unit mounting device of the publication has such a structure that the unit of laminated electrostrictive elements is sandwiched between upper and lower plates which are connected through connecting bolts and nuts. The upper plate is secured to the power unit and the lower plate is connected through a rubber vibration insulator to the support structure.

However, in this known mounting device, due to its inherent construction, the expansion and contraction of the unit of laminated electrostrictive elements cause repeated applications of stress to the connecting bolts. This tends to shorten the life of each bolt.

Furthermore, in this known mounting device, the connecting bolts are quite strongly fastened by the nuts for assuredly holding the unit of laminated electrostrictive elements even under the contraction condition of the same. However, this tight fastening of the bolts prevents the unit of laminated electrostrictive elements from achieving a sufficient expansion, and thus, the vibration damping effect of the device is poor.

SUMMARY OF THE INVENTION

It is therefore an object of the present invention to provide a power unit mounting device which is free of the above-mentioned drawbacks.

That is, according to the present invention, there is provided a power unit mounting device in which any stress applied to connecting bolts by which the laminated electrostrictive elements are fastened is minimized and in which the laminated electrostrictive elements can sufficiently expand.

According to a first aspect of the present invention, there is provided a mounting device which comprises first and second plates which are spaced from each other; a bracket member having a flat plate portion which is disposed between the first and second plates; a first active damping actuator intimately disposed between the first plate and the flat plate portion; a second active damping actuator intimately disposed between the flat plate portion and the second plate, each of the first and second active damping actuators selectively expanding and contracting in accordance with an electric power applied thereto; connecting means for connecting the first and second plates to tighten the first and second active damping actuators therebetween; and control means for controlling the electric power in such a manner that the expanding and contracting vibrations of said first and second active damping actuators are equal in amplitude but different in phase by 180 degrees.

According to a second aspect of the present invention, there is provided a mounting device for mounting a power unit on a fixed structure therethrough. The mounting device comprises first, second and third parallel plates, the third plate being adapted to be secured to the fixed structure; a bracket member including a first flat plate portion spacedly disposed between the first and second plates and a second flat plate portion straddling the first plate; a first active damping actuator intimately disposed between the first plate and the first flat plate portion; a second active damping actuator intimately disposed between the first flat plate portion and the second plate, each of the first and second active damping actuators selectively expanding and contracting in accordance with an electric power applied thereto; connecting bolts, each extending between the first and second plates to fasten the first and second active damping actuators therebetween; a rubber vibration insulator intimately disposed between the second and third plates; and control means for controlling the electric power in such a manner that the expanding and contracting vibrations of said first and second active damping actuators are equal in amplitude and different in phase by 180 degrees.

According to a third aspect of the present invention, there is provided an engine vibration damping system in a motor vehicle having an engine and a vehicle body. The system comprises first and second plates which are spaced from each other, the second plate being secured to the vehicle body; a bracket member having a flat plate portion which is disposed between the first and second plates, the bracket member mounting thereon the engine; a first active damping actuator intimately disposed between the first plate and the flat plate portion; a second active damping actuator intimately disposed between the flat plate portion and the second plate, each of the first and second active damping actuators selectively expanding and contracting in accordance with an electric power applied thereto; connecting means for connecting the first and second plates to tighten the first and second active damping actuators therebetween; and control means for controlling the electric power in such a manner that the expanding and contracting vibrations of said first and second active damping actuators are equal in amplitude but different in phase by 180 degrees.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
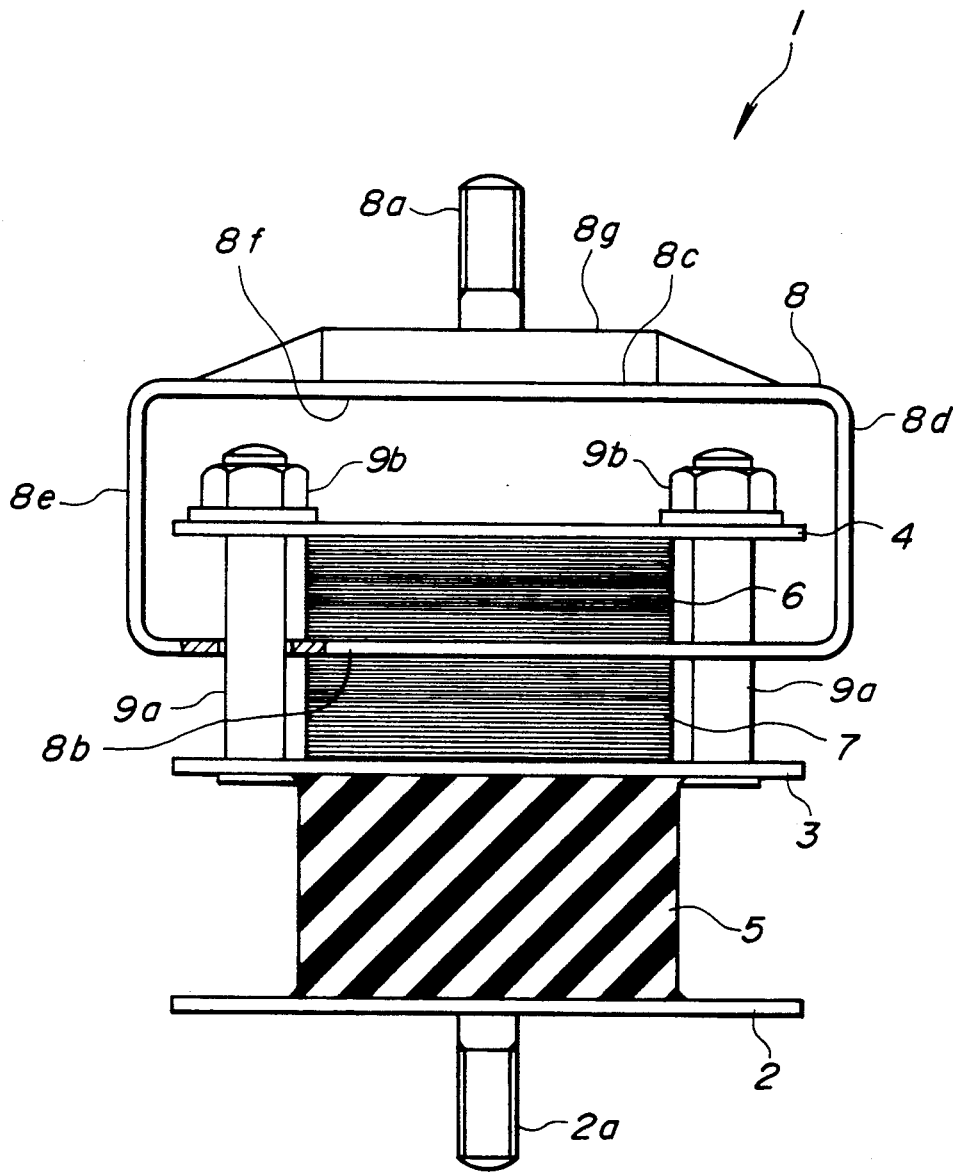
FIG. 1 is a partially cut front view of a power unit mounting device of a first embodiment of the present invention.
Figure 2:
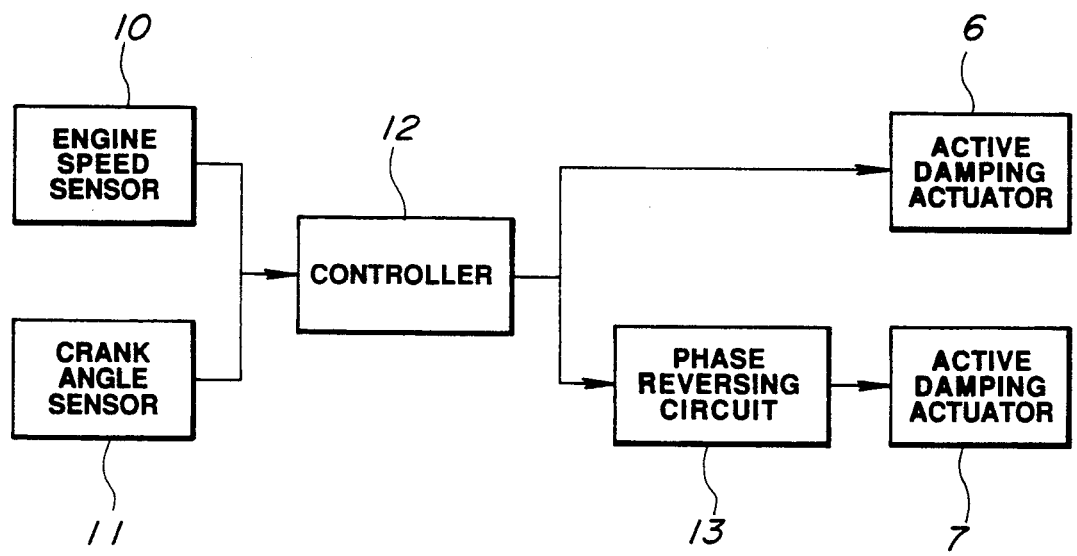
FIG. 2 is a block diagram of a control system used in the first embodiment.
Figure 3:
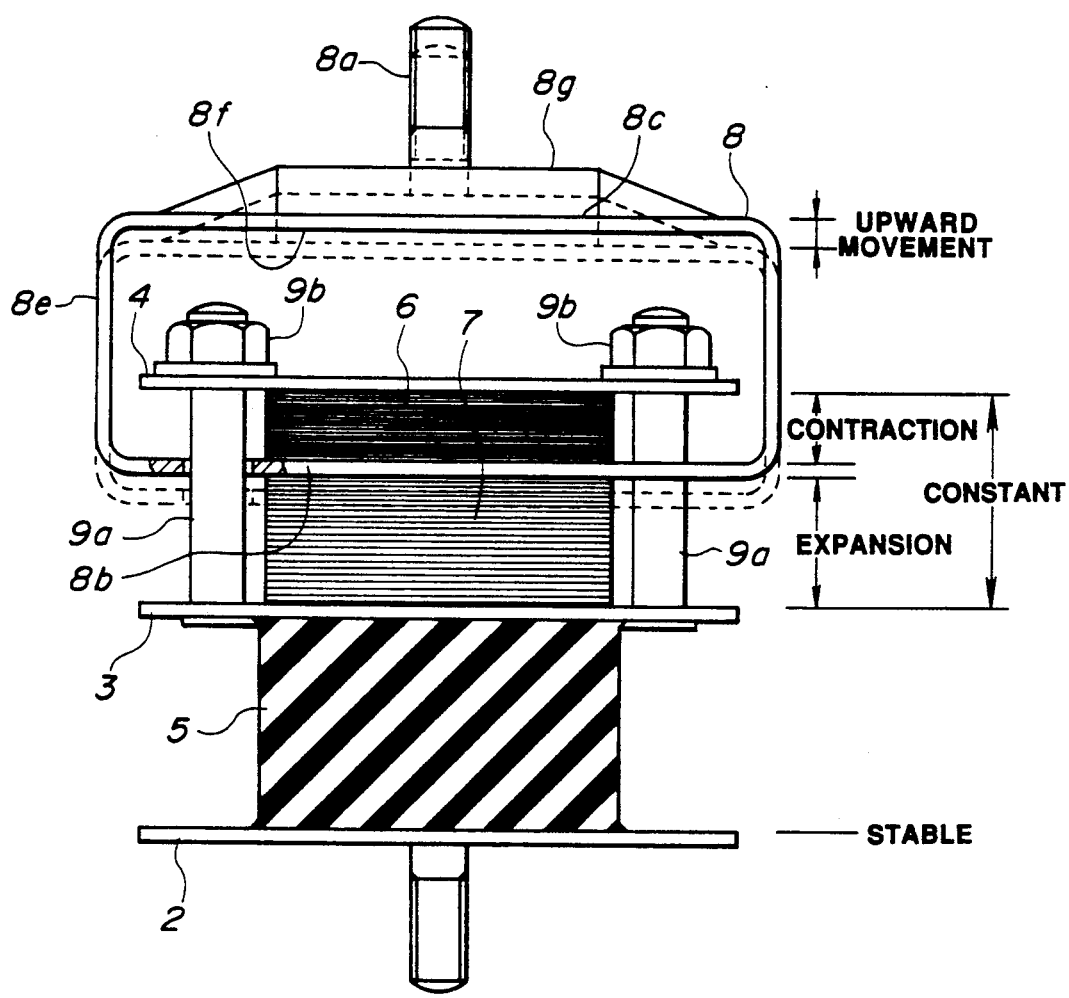
FIG. 3 is a view similar to FIG. 1, but showing a condition wherein the mounting device is under operation.

Referring to FIGS. 1 to 3, particularly FIG. 1, there is shown a power unit mounting device 1 which is a first embodiment of the present invention.

As is seen from FIG. 1, the mounting device 1 comprises three vertically spaced parallel metal plates 2, 3 and 4. Between the metal plates 2 and 3, there is interposed a rubber vibration insulator 5. The insulator 5 is secured to the metal plates 2 and 3 by means of suitable adhesive. As will be described hereinafter, the rubber vibration insulator 5 functions to absorb vibrations other than those caused by a secondary component of engine rotation. That is, the relative displacement between the two metal plates 2 and 3 is carried out together with the elastic deformation of the insulator 5.

The metal plate 2 has at its lower surface an integral bolt 2a which is to be secured to a vehicle body (not shown).

Between the metal plates 3 and 4, there are interposed two active damping actuators 7 and 6 which are arranged in tandem. Each actuator 7 or 6 comprises a unit of laminated electrostrictive elements and is so arranged that the direction in which the thickness of the unit varies is perpendicular to the metal plates 3 and 4. Preferably, the two actuators 7 and 6 are the same in size and performance. The damping actuator 6 has an upper surface bonded to the metal plate 4 and the other damping actuator 7 has a lower surface bonded to the metal plate 3.

Between the two damping actuators 6 and 7, there is intimately interposed a lower flat wall 8b of a box-like bracket 8. That is, the box-like bracket 8 essentially comprises upper and lower rectangular flat walls 8c and 8b and opposed flat side walls 8d and 8e. Thus, a rectangular through bore 8a is defined by these walls 8b, 8c, 8d and 8e, through which the damping actuator 6 is exposed, as is understood from the drawing. As shown, the upper and lower flat walls 8c and 8b are arranged in parallel with the metal plates 2, 3 and 4.

The upper flat wall 8c has at its upper surface an integral bolt 8a which is to be secured to a power unit (or engine) which is the vibration source. A reinforcing rib 8g is integrally formed on the upper flat wall 8c.

The metal plates 3 and 4 are connected through a plurality of connecting bolts 9a and nuts 9b. For this connection, the lower flat wall 8b of the box-like bracket 8 is formed with a corresponding number of openings (no numerals) through which the connecting bolts 9a spacedly pass.

In practical use, the mounting device 1 is interposed between the vehicle body and power unit having the lower bolt 2a secured to the vehicle body and the upper bolt 8a secured to the power unit.

Like in the afore-mentioned known device, the mounting device 1 is so oriented that the direction in which the thickness of the active damping actuators 6 and 7 varies is consistent with the direction in which the power unit vibrates. That is, in case of mounting a four cylinder in-line engine, the mounting device 1 is so oriented that the metal plates 2, 3 and 4 are perpendicular to the direction in which the pistons move. In fact, the reciprocating movements of the pistons produce a non-parallel inertia force as a secondary component of engine rotation, which induces a vertical vibration of the engine.

FIG. 2 shows a block diagram of a control circuit for controlling electric power or voltages applied to the active damping actuators 6 and 7.

As is known, the vertical vibration of the engine caused by the secondary component of engine rotation is transmitted through the engine mounting device 1 to the vehicle body, so that there is produced in a vehicle cabin an oppressive noise of about 100 to 200 Hz. However, since the vertical vibration of the engine caused by the secondary component of engine rotation is produced by the reciprocating movement of the pistons, the amplitude and phase of such vertical vibration of engine can be derived from the engine speed and the crank angle.

Accordingly, the control circuit employs both an engine speed sensor 10 for sensing the engine speed and a crank angle sensor 11 for sensing the crank angle. Signals issued from these sensors 10 and 11 are fed to a controller 12 which comprises a microcomputer. By comparing these signals with reference values provided by reference maps, the controller 12 determines the voltage, frequency and phase of a sine-wave electric power applied to the active damping actuator 6. The sine-wave electric power determined by the controller 12 is reversed in phase by a phase reversing circuit 13 and fed to the other active damping actuator 7. Thus, the expanding and contracting vibrations of these two active damping actuators 6 and 7 are equal in amplitude but different in phase by 180 degrees.

In the following, operation of the first embodiment will be described with reference to FIG. 3.

Under operation, the engine is forced to vibrate vertically under the influence of the secondary component of engine rotation.

When, now, the engine is forced to move upward from its neutral position, the box-like bracket 8 fixed to the engine is forced to move upward from a neutral position illustrated by a phantom line to an upper position illustrated by a solid line, as shown in FIG. 3. At this time, by processing information signals from the engine speed sensor 10 and the crank angle sensor 11 in the above-mentioned manner, the controller 12 of the control circuit provides the active damping actuator 6 with a voltage instruction signal to contract the same and at the same time the controller 12 provides through the phase reversing circuit 13 the other active damping actuator 7 with a phase-reversed voltage instruction signal to expand the same. Because the connecting bolts 9a for connecting the metal plates 3 and 4 spacedly pass the openings of the lower flat wall 8b of the bracket 8, the upward movement of the bracket 8 is not interrupted by the bolts 9a.

That is, the upward movement of the bracket 8 caused by the upward movement of the engine is substantially absorbed by both the contraction of the damping actuator 6 and the expansion of the other damping actuator 7, and thus, such upward movement is not transmitted to the vehicle body.

When, on the other hand, the engine is forced to move downward inducing a downward movement of the bracket 8, the two damping actuators 6 and 7 are forced to expand and contract respectively by receiving instruction signals from the controller 12. Thus, such downward movement is not transmitted to the vehicle body.

As a result, the vertical vibration of the engine caused by the secondary component of the engine rotation is not transmitted to the vehicle body. Thus, the vehicle cabin is relieved from suffering an oppressive noise of about 100 to 200 Hz.

According to the present invention, the following advantageous features are further obtained.

Because the two active damping actuators 6 and 7 are arranged to cancel or absorb the relative movements therebetween, the total thickness of the two damping actuators 6 and 7 is substantially unchanged under practical usage of the mounting device 1. This means that the distance between the two metal plates 3 and 4 is kept constant. Thus, unlike the case of the afore-mentioned conventional mounting device, the expansion and contraction of these damping actuators 6 and 7 have no bad effect on the connecting bolts 9a.

Because of the mutual cancellation of the movements of the two actuators 6 and 7, each active damping actuator 6 or 7 can exhibit the optimum performance without suffering an abnormal load from the connecting bolts 9a.

Furthermore, even when an abnormally big external force is suddenly applied to the mounting device 1 in a direction to enlarge the distance between two metal plates 3 and 4, the bolts 9a and nuts 9b suppress such undesired enlargement of the distance, and thus, damage of the damping actuators 6 and 7 is avoided.

As is described hereinbefore, preferably, the two active damping actuators 6 and 7 have the same size and performance. However, if such identity is not permitted, different types (viz., higher and lower power types) of actuators may be used. In this case, a suitable power amplifying circuit is interposed between the controller 12 and a lower power damping actuator to amplify the instruction voltage signal applied to the lower power damping actuator.

Figure 4:
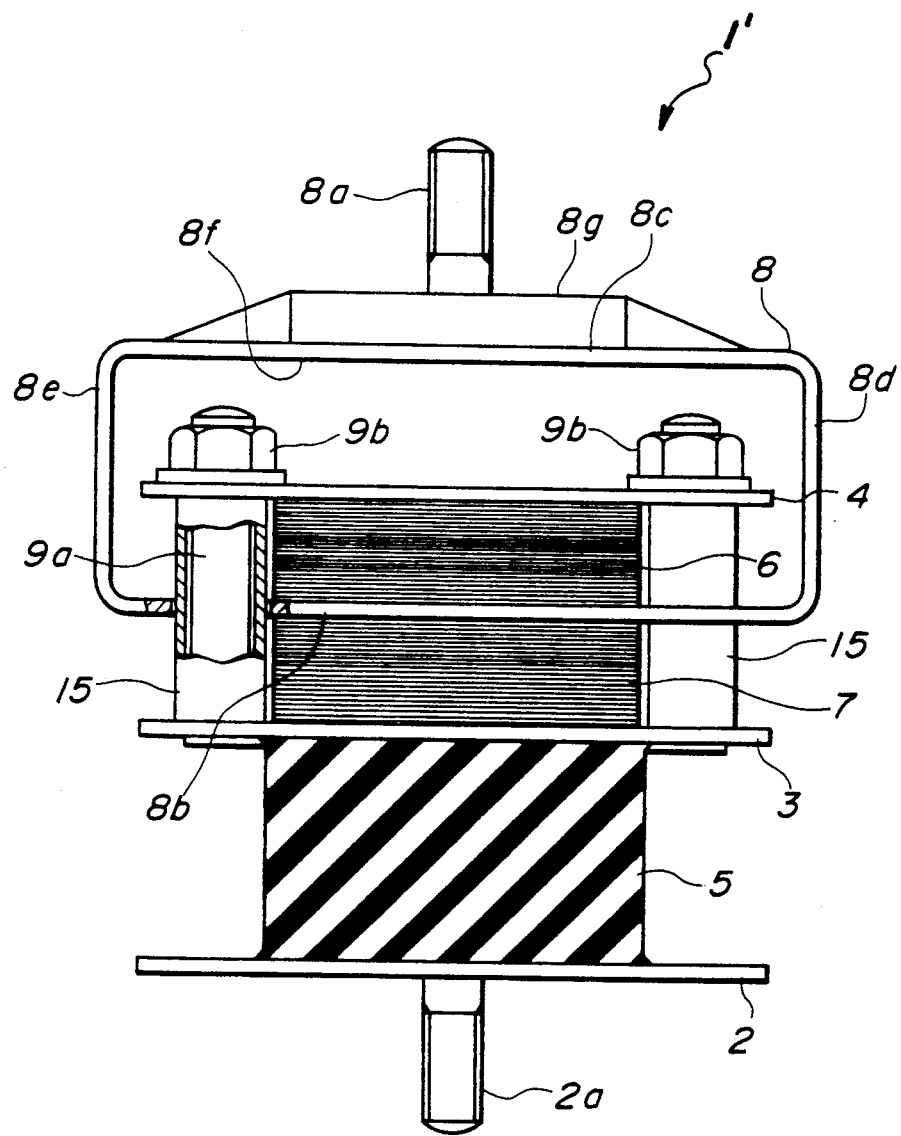
FIG. 4 is a view similar to FIG. 1, but showing a second embodiment of the invention.

Referring to FIG. 4, there is shown a power unit mounting device 1' of a second embodiment of the present invention. Parts identical to those of the above-mentioned first embodiment 1 are denoted by the same numerals.

Since the second embodiment 1' is similar in construction to the first embodiment 1, only parts and construction different from those of the first embodiment 1 will be described in the following.

In the second embodiment 1', each connecting bolt 9a is housed in a metal collar 15. As is seen from FIG. 4, each collar 15 is put between the two metal plates 3 and 4. That is, the collar 15 serves as a strut by which the distance between the two metal plates 3 and 4 is assuredly held.

Because of provision of the metal collars 15, the durability of the two active damping actuators 6 and 7 is assured. That is, even when an abnormally large external force is applied to the mounting device 1' in a direction to reduce the distance between the two metal plates 3 and 4, the metal collars 15 suppress such undesired reduction of the distance.

Although the above-mentioned two embodiments 1 and 1' are described to use a unit of laminated electrostrictive elements as the damping actuator 6 or 7, piezoelectric elements, magnetostrictive elements or the like may used in the invention.

I claim:

1. A mounting device comprising:

first and second plates which are spaced from each other;

a bracket member having a flat plate portion which is disposed between said first and second plates;

a first active damping actuator intimately disposed between said first plate and said flat plate portion;

a second active damping actuator intimately disposed between said flat plate portion and said second plate, each of said first and second active damping actuators being forced to vibrate while selectively expanding and contracting in accordance with an electric power applied thereto;

connecting means for connecting said first and second plates to tighten said first and second active damping actuators between said first and second plates; and control means for controlling the electric power in such a manner that expansion and contraction vibrations of said first and second active damping actuators are equal in amplitude but different in phase by 180 degrees.

2. A mounting device as claimed in claim 1, in which said electric power applied to said first and second active damping actuators is a sine-wave voltage signal.

3. A mounting device as claimed in claim 2, in which said control means controls the sine-wave voltage signal in such a manner that voltage signals simultaneously applied to said first and second active damping actuators are equal in amplitude but different in phase by 180 degrees.

4. A mounting device as claimed in claim 1, in which said electric power applied to said first and second active damping actuators is a combination of electric powers, at least one of said powers being in the shape of a sine-wave.

5. A mounting device as claimed in claim 1, further comprising a rubber vibration insulator which is fixed to an outer surface of said second plate.

6. A mounting device as claimed in claim 5, in which said connecting means comprises:

a plurality of connecting bolts, each bolt extending between said first and second plates; and a plurality of nuts, each nut being operatively engaged with one end of one of said connecting bolts.

7. A mounting device as claimed in claim 6, in which each of said connecting bolts spacedly passes through an opening formed in said flat plate portion of said bracket member.

8. A mounting device as claimed in claim 7, in which said bracket member further has another plate portion which straddles said first plate.

9. A mounting device as claimed in claim 6, in which each of said connecting bolts is housed in a collar, said collar being put between said first and second plates to serve as a strut by which the distance between the two plates is assuredly kept.

10. A mounting device as claimed in claim 1, in which each of said first and second active damping actuators is a unit of laminated electrostrictive elements.

11. A mounting device as claimed in claim 10, in which each of said first and second active damping actuators is so oriented that the direction in which the damping actuator expands and contracts is perpendicular to the parallel first and second plates.

12. A mounting device for mounting a power unit on a fixed structure therethrough, said mounting device comprising:

first, second and third parallel plates, said third plate being adapted to be secured to said fixed structure;
a bracket member including a first flat plate portion spacedly disposed between said first and second plates and a second flat plate portion straddling said first plate;
a first active damping actuator intimately disposed between said first plate and said first flat plate portion;
a second active damping actuator intimately disposed between said first flat plate portion and said second plate, each of said first and second active damping actuators selectively expanding and contracting in accordance with an electric power applied thereto;
connecting bolts, each extending between said first and second plates to fasten said first and second active damping actuators therebetween;
a rubber vibration insulator intimately disposed between said second and third plates; and
control means for controlling the electric power in such a manner that the expanding and contracting vibrations of said first and second active damping actuators are equal in amplitude and different in phase by 180 degrees.

13. A mounting device as claimed in claim 12, in which said first flat portion of said bracket member is formed with a plurality of openings through which said connecting bolts spacedly pass.

14. A mounting device as claimed in claim 13, further comprising collars which respectively house therein said connecting bolts, each collar being put between said first and second plates to serve as a strut by which the distance between said first and second plates is assuredly kept.

15. In a motor vehicle having an engine and a vehicle body, an engine vibration damping system comprising:
first and second plates which are spaced from each other, said second plate being secured to said vehicle body;
a bracket member having a flat plate portion which is disposed between said first and second plates, said bracket member mounting thereon said engine;
a first active damping actuator intimately disposed between said first plate and said flat plate portion;
a second active damping actuator intimately disposed between said flat plate portion and said second plate, each of said first and second active damping actuators selectively expanding and contracting in accordance with an electric power applied thereto;
connecting means for connecting said first and second plates to tighten said first and second active damping actuators therebetween; and
control means for controlling the electric power in such a manner that the expanding and contracting vibrations of said first and second active damping actuators are equal in amplitude but different in phase by 180 degrees.

16. An engine vibration damping system as claimed in claim 15, in which said control means comprises:
an engine speed sensor for issuing an information signal representative of the rotation speed of said engine;
a crank angle sensor for issuing an information signal representative of the crank angle of the engine;
a controller for controlling the electric power applied to said first and second active damping actuators by analyzing the information signals from said engine speed sensor and said crank angle sensor; and
a phase reversing circuit for reversing the phase of the electric power applied to one of said first and second active damping actuators.

* * * * *